Figure 1:
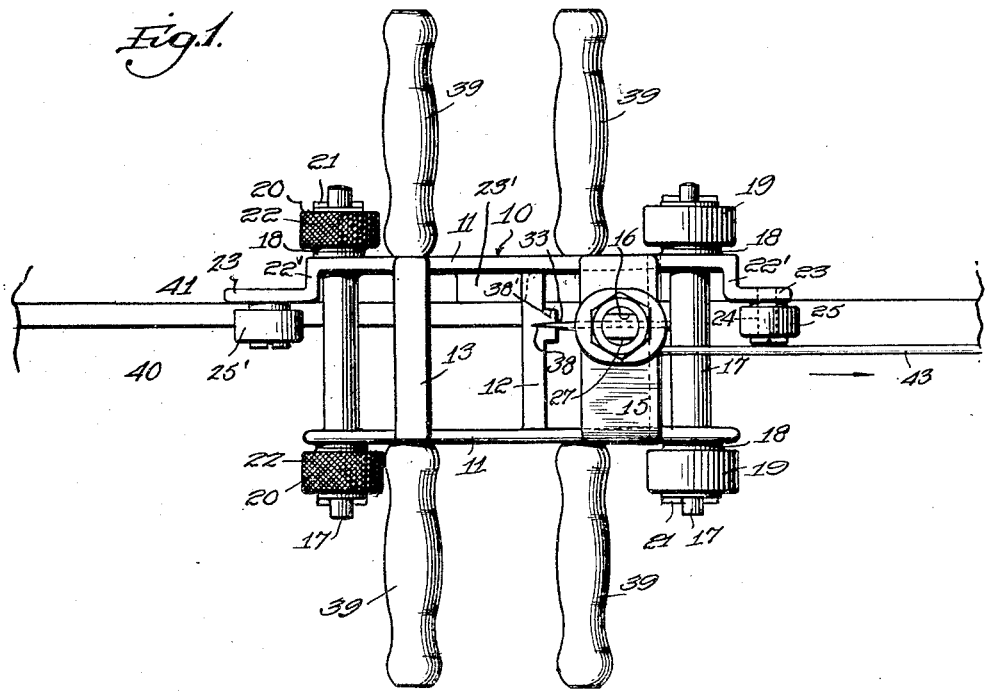

Sept. 16, 1930.  E. T. SCHMIDT  1,776,046
SEAM CUTTER
Filed April 20, 1929   2 Sheets-Sheet 1

Inventor
EDWIN T. SCHMIDT

By C. L. Parker Jr.
Attorney

Sept. 16, 1930.   E. T. SCHMIDT   1,776,046
SEAM CUTTER
Filed April 20, 1929   2 Sheets-Sheet 2

Inventor
EDWIN T. SCHMIDT
By
C. L. Parker Jr.
Attorney

Patented Sept. 16, 1930

1,776,046

UNITED STATES PATENT OFFICE

EDWIN T. SCHMIDT, OF LANCASTER, PENNSYLVANIA

SEAM CUTTER

Application filed April 20, 1929. Serial No. 356,838.

This invention relates to a seam cutter particularly adapted for use in cutting seams in linoleum and other material wherein it is difficult to obtain evenly cut edges.

An object of this invention is to provide a seam cutter adapted to travel over the surface of material to be cut and provided with a cutting member which may be adjusted vertically to cut substantially any thickness of material.

Another object is to provide a device of the type referred to wherein the cutter is provided with rollers to enable it to more easily travel over the surface of material to be cut.

A further object is to provide means carried by the cutter to enable pressure to be exerted downwardly on the surface of the material in substantially the same plane with the cutting member, both forwardly and rearwardly of the latter.

A further object is to provide means carried by the cutter for guiding the latter in its movement over the surface of material to be cut, the guide means serving to space the cutting member from the edge of the material to be cut whereby the material will be cut on a line substantially parallel with the edge thereof.

A further object is to provide a novel knife blade holder adapted to be secured to a movable frame, the knife holder being adjustable vertically.

A further object is to provide a knife holder adapted to carry a knife blade in a vertical position and to provide means for assisting the knife holder to maintain the knife blade in vertical position.

A further object is to provide a knife holder with a partially tapered vertical slot and inwardly directed shoulders projecting into said slot, the knife blade being arranged in the slot and being held therein by the resiliency of the holder adjacent the slot and by means of a nut threaded on the holder.

Other objects and advantages of this invention will become apparent during the course of the following description.

Figure 2:
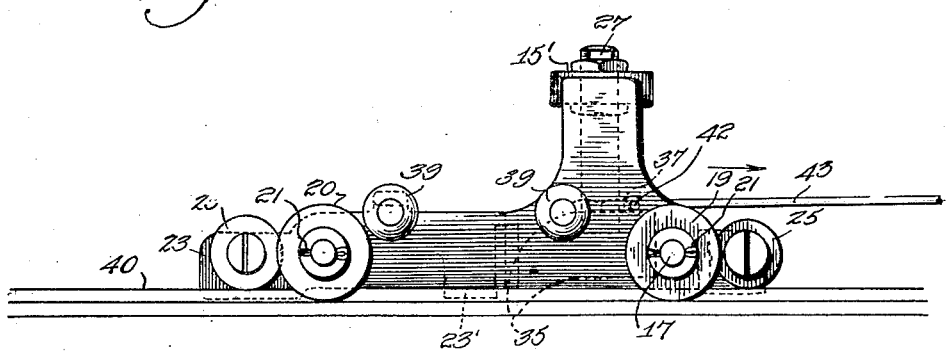
Figure 3:
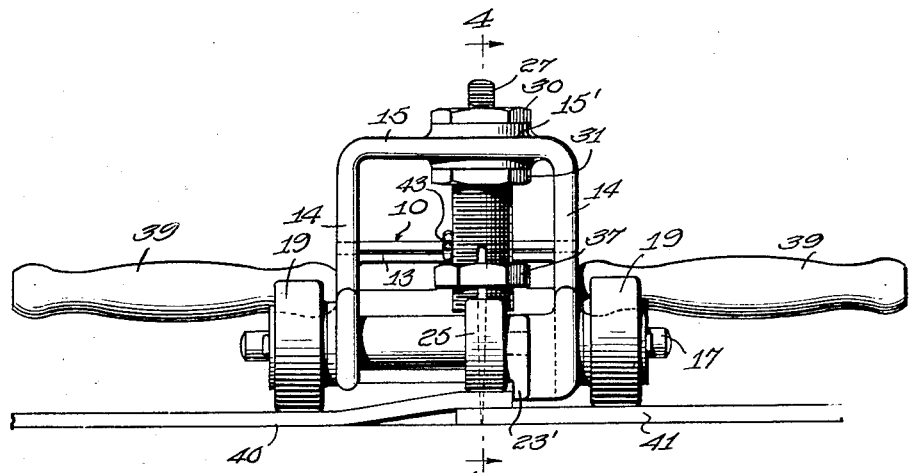
Figure 4:
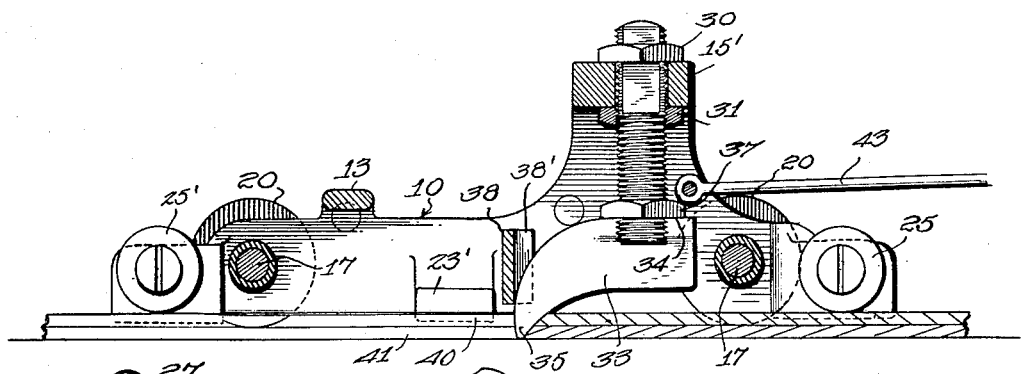
Figure 6:
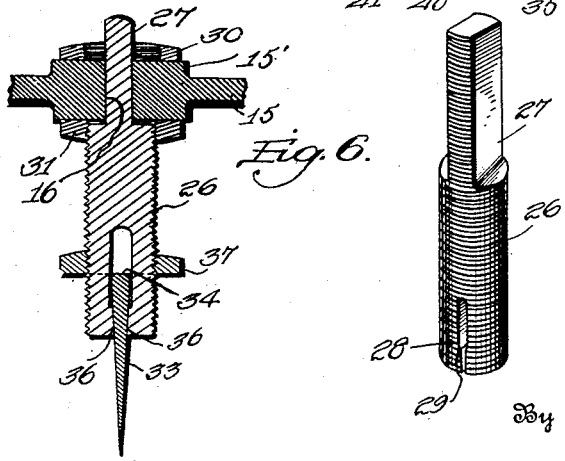
Figure 5:
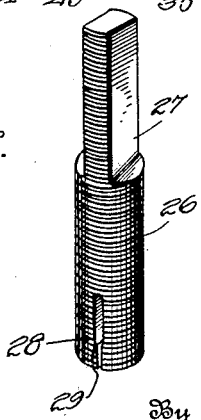

In the drawings I have shown one embodiment of my invention. In this showing:

Figure 1 is a plan view,
Figure 2 is a side elevation,
Figure 3 is a front elevation,
Figure 4 is a sectional view taken substantially on line 4—4 of Figure 3, parts being shown in elevation,
Figure 5 is a perspective view of the knife holding member, and,
Figure 6 is a fragmentary sectional view showing the knife blade in position in the holder.

Referring to the drawings the numeral 10 indicates a frame member as a whole, provided with spaced parallel sides 11 joined together by cross members 12 and 13. Adjacent the front of the frame upright arms 14 are preferably formed integral with the frame and these arms are connected by a relatively wide cross member 15, preferably formed integral with the arms. The member 15 is provided with a somewhat thickened portion 15' and this portion is provided with a substantially rectangular shaped opening 16 for a purpose to be described. Adjacent the forward and rear end of the frame shafts 17 extend through openings therein and are journaled in bearings 18 preferably formed integral with the frame. A plurality of rollers 19 and 20 are arranged on these shafts and may be secured in place by cotter pins or the like 21. The rollers 19 and 20 are preferably formed of hard rubber or other suitable material and the rear rollers 20 are knurled substantially as shown at 22 for a purpose to be described. As clearly shown in Figure 1, one of the side members 11 has extensions 22' adjacent the forward and rear extremity thereof, extending inwardly for a short distance, and guide lugs 23 preferably formed integral with the extensions 22' are arranged parallel with the side arms 11. The front lug 23 has a pin 24 arranged therein, this pin serving to rotatably carry a pressure roller 25. A rear pressure roller 25' is similarly carried by the rear lug 23. Intermediate the guide lugs 23, a third guide lug 23' is carried by the side member 11.

The numeral 26 indicates an externally threaded knife holding member provided with flattened portions 27 adjacent one extremity thereof and provided with a substantially axial vertical slot 28 adjacent the opposite extremity. Inwardly extending shoulders 29 are arranged on the member 26 adjacent its lower extremity and these shoulders project slightly into the slot 28 for a purpose to be described. As shown in Figure 5, the vertical sides of the slot 28 above the shoulders 29 are preferably parallel with the flattened portions 27 of the member 26 while the sides of the slot below the shoulders are tapered. The flattened portions 27 of the holder fit within the opening 16 in the cross frame member 15 and upper and lower nuts 30 and 31 respectively are threaded on the member 26 to retain this member in position within the opening 16.

The numeral 33 indicates a knife blade provided with a substantially flat upper edge 34 and provided with a downwardly turned cutting point 35. The knife blade is carried in the slot 28 and as clearly shown in Figure 6, the blade tapers downwardly as at 36 to more easily fit within the tapered portion of the slot 28. A flat bottomed nut 37 is threaded on the holder 26 and may be moved to a position engaging the flat edge 34 of the knife blade whereby the knife blade will be rigidly secured in the holder. As shown in Figures 1 and 4 the cross frame member 12 is provided with a forwardly extending vertical portion 38' having therein a substantially V-shaped slot 38 in which a portion of the knife blade above the point 35 is adapted to fit.

Suitable handle members 39 project laterally from the frame member to enable the device to be manually operated. A stud or the like 42 is carried by the frame and a length of wire or cable 43 may be secured thereto to enable the device to be pulled at the same time downward pressure is exerted manually.

The operation of the device is as follows:

Referring to Figure 3 the numerals 40 and 41 indicate two parallel strips of linoleum or other material arranged with their extremities overlapping. The device is placed in position on the surface of the material to be cut substantially as shown in Figure 1. When the device is in cutting position the side rollers are on different pieces of linoleum and the knife blade 33 is arranged with the point 35 thereof substantially flush with the bottom edge of the lower piece of linoleum. The guide lugs 23 and 23' abut against the edge of the material indicated by the numeral 40 and the pressure rollers 25 and 25' engage the upper surface of this piece of material directly in front and in the rear of the cutting blade.

When the device has been placed in the position just described the operator grasps the handles and exerts a downward and forward pressure to force the cutting blade through the material. The blade 33 is held in vertical position within the slot 28 as will be understood. The cross frame member 12 having the opening 38 into which a portion of the blade extends, assists in retaining the blade in vertical position during the operation of the device. The V-slot 38 also holds the blade securely and prevents any twisting of the knife horizontally. The lugs 23 and 23' bear against the edge of the material and enable the blade to cut along a line substantially parallel with the edge. The pressure roller 25 serves to keep the two pieces of material pressed tightly against each other and against whatever base the material may be resting upon, whereby the cutting by the knife blade immediately following the roller can be accomplished more easily. The roller 25 also prevents the top layer of material from bulging and the rear roller 25' prevents the cut-off strip of the top layer of material from rising out of its position.

It will be apparent that by the provision of the nuts 30 and 31 the knife holder 26 is adjustable vertically within the opening 16 whereby the device may be used in cutting material of various thicknesses. The nut 37 threads down into engagement with the flat upper edge 34 of the blade and its lowermost position is well beneath the upper extremity of the slot 28 thus serving to prevent accidental displacement of the blade. The rear rollers 20 are knurled to permit them to better engage the surface of the material to be cut.

The device is simple in construction, inexpensive, easily assembled and with proper care will last indefinitely.

It is to be understood that the form of the invention herewith shown and described is to be taken as a preferred example of the same, and that various changes in the shape, size, and arrangement of parts may be made without departing from the spirit of the invention or the scope of the subjoined claims.

I claim:

1. A device of the character described comprising a frame, a removable cutting member arranged on said frame, and means for enabling said frame to be moved over a surface to be cut, said means including rollers associated with said frame and at least one pressure roller arranged for movement in the same path as said cutting member.

2. A device of the character described comprising a frame, a vertical cutting member arranged on said frame, rollers for enabling said frame to be moved over a surface to be cut, pressure rollers arranged for movement in the same path as said cutting member, and means for guiding said frame in its movement over said surface.

3. A device of the character described comprising a movable frame, a threaded member depending from said frame and provided with a slot therein, a cutting member arranged in said slot, means for securing said cutting member in said slot in a vertical position, and additional means carried by said frame for assisting said first named means in retaining said cutting member in a vertical position and for preventing twisting of said cutting member.

4. A device of the character described comprising a movable frame, a threaded member secured in and depending from said frame and being provided with a vertical slot therein, inwardly extending shoulders arranged on said threaded member and projecting into said slot, the sides of said slot being tapered below said shoulders, a cutting member arranged in said slot and provided with tapered sides adapted to engage the tapered sides of said slot, means for retaining said cutting member in a vertical position, and means for preventing twisting of said cutting member.

5. A device of the character described comprising a movable frame, a threaded member depending from said frame and provided with a slot therein, said member being slightly resilient adjacent said slot, a cutting member arranged in said slot, the resiliency of said threaded member serving to hold said cutting member in said slot in a vertical position, means threaded on said threaded member and adapted to engage said cutting member for assisting in securing the latter in vertical position, and means carried by said frame for preventing twisting of said cutting member.

6. A device of the character described comprising a movable frame provided with an elongated opening therein, a threaded member provided with flattened portions adapted to be received in said opening, means for adjustably securing said member in said opening, and a vertically arranged cutting member carried by said threaded member.

7. A device of the character described comprising a movable frame provided with an elongated opening therein, a threaded member provided with flattened portions adapted to be received in said opening, means for adjustably securing said member in said opening, said threaded member being also provided with a vertical slot therein, a cutting member arranged in said slot, means for securing said cutting member in a vertical position in said slot, and additional means for preventing twisting of said cutting member.

8. A device of the character described comprising a movable frame provided with a substantially rectangularly shaped opening therein, a threaded member provided with a flattened portion adapted to be received in said opening, means for adjustably securing said member in said opening, said threaded member being further provided with a vertical slot therein, inwardly extending shoulders arranged on said threaded member and projecting into said slot, the sides of said slot below said shoulders being tapered, a cutting member arranged in said slot and provided with tapering sides adapted to engage the tapering sides of said slot, a nut arranged on said threaded member and adapted to secure said cutting member in vertical position in said slot, and a cross bar carried by said frame and provided with a groove therein, a portion of said cutting member being adapted to extend into said groove to prevent twisting of said cutting member from its vertical position.

In testimony whereof I affix my signature.

EDWIN T. SCHMIDT.